US007869891B2

(12) United States Patent
Kim et al.

(10) Patent No.: US 7,869,891 B2
(45) Date of Patent: Jan. 11, 2011

(54) METHOD AND APPARATUS FOR GENERATING BITSTREAM OF AUDIO SIGNAL AND AUDIO ENCODING/DECODING METHOD AND APPARATUS THEREOF

(75) Inventors: Sanwook Kim, Seoul (KR); Dohyung Kim, Hwaseong-si (KR); Miyoung Kim, Suwon-si (KR); Miao Lei, Yongin-si (KR); Shihwa Lee, Seoul (KR); Jianxian Yan, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1177 days.

(21) Appl. No.: 11/445,312

(22) Filed: Jun. 2, 2006

(65) Prior Publication Data

US 2006/0293902 A1 Dec. 28, 2006

(30) Foreign Application Priority Data

Jun. 24, 2005 (KR) ..................... 10-2005-0055116

(51) Int. Cl.
*G06F 17/00* (2006.01)

(52) U.S. Cl. .......................................... 700/94; 386/96

(58) Field of Classification Search ................. 704/500; 700/94; 386/96, 97, 104, 39
See application file for complete search history.

(56) References Cited

U.S. PATENT DOCUMENTS

| | | | | |
|---|---|---|---|---|
| 5,040,217 | A * | 8/1991 | Brandenburg et al. | 704/200.1 |
| 5,488,665 | A * | 1/1996 | Johnston et al. | 381/2 |
| 6,487,535 | B1 | 11/2002 | Smyth et al. | |
| 2002/0150126 | A1 * | 10/2002 | Kovacevic | 370/503 |
| 2003/0093264 | A1 * | 5/2003 | Miyasaka et al. | 704/205 |

OTHER PUBLICATIONS

Korean Office Action mailed on Sep. 11, 2006 in corresponding Korean patent application No. 10-2005-0055116.

* cited by examiner

*Primary Examiner*—Walter F Briney, III
(74) *Attorney, Agent, or Firm*—Staas & Halsey LLP

(57) ABSTRACT

A method and apparatus for generating a bitstream of an audio signal, in which an audio signal can be easily extended to a multichannel audio signal, the processing speed of an audio signal can be improved, and channel signals of an audio signal can be processed simultaneously, and an audio encoding/decoding method and apparatus using the method and apparatus. The method for generating a bitstream of an audio signal using an encoded audio signal and encoding information includes generating a flag indicating whether the encoded audio signal is a multichannel audio signal, generating a bitstream header including the generated flag, and generating the bitstream using the generated bitstream header and the encoded audio signal.

47 Claims, 10 Drawing Sheets

METHOD AND APPARATUS FOR GENERATING BITSTREAM OF AUDIO SIGNAL AND AUDIO ENCODING/DECODING METHOD AND APPARATUS THEREOF

CROSS-REFERENCE TO RELATED APPLICATION

This application claims the benefit of Korean Patent Application No. 10-2005-0055116, filed on Jun. 24, 2005, in the Korean Intellectual Property Office, the disclosure of which is incorporated herein by reference.

BACKGROUND OF THE INVENTION

1. Field of the Invention

The present invention relates to audio signal processing, and more particularly, to a method and apparatus for generating a bitstream of an audio signal, in which an audio signal can be easily extended to a multichannel audio signal, the processing speed of an audio signal can be improved, and channel signals of an audio signal can be processed simultaneously, and an audio encoding/decoding method and apparatus using the method and apparatus.

2. Description of Related Art

FIG. 1 is a block diagram of a conventional audio encoder. Referring to FIG. 1, the conventional audio encoder includes a time/frequency mapping unit 100, a psychoacoustic modeling unit 110, a data processing unit 120, a quantizing unit 130, and a bitstream generating unit 140.

The time/frequency mapping unit 100 converts an audio signal in a time domain into signals in a frequency domain. A difference perceived by humans between the characteristics of a signal is not so great in the time domain, but the converted signals in the frequency domain vary from perceivable signals to unperceivable signals in each frequency band according to a human psychoacoustic model. Thus, compression efficiency can be improved by changing the number of bits assigned to each frequency band.

The psychoacoustic modeling unit 110 calculates a masking threshold for each frequency band using a masking phenomenon of the converted signals in the frequency domain.

By using the masking threshold for each frequency band input from the psychoacoustic modeling unit 110, the data processing unit 120 performs signal processing to improve encoding efficiency while minimizing a sound quality change that can be perceived by human. The data processing unit 120 uses a signal processing method for improving encoding efficiency, such as time-domain noise simulation, intensity stereo processing, perceptual-noise substitution, or mid/side (M/S) stereo processing.

The quantizing unit 130 performs scalar-quantization on frequency signals in each frequency band so that the magnitude of quantization noise in each frequency band is less than a corresponding masking threshold. Thus, humans cannot perceive the quantization noise even though the quantization noise is included in the audio signal. The bitstream generating unit 140 generates a bitstream to fit it into a predetermined data structure by combining the quantized audio signal of the encoder and information about the encoding.

When the audio signal to be encoded is a multichannel audio signal, it is generally encoded in predetermined units of encoding, instead of in channel units. The predetermined unit of coding means at least one channel signal that is simultaneously encoded.

For example, when an audio signal includes 5 channel signals, i.e., a stereo channel signal, a mono channel signal, a center channel signal, a surround left channel signal, and a surround right channel signal, the predetermined units of encoding are the stereo channel signal and the mono channel signal that are encoded together, the center channel signal, and the surround left channel signal and the surround right channel signal that are encoded together. Since two channel signals have high redundancy, encoding efficiency can be improved by encoding the two channel signals at the same time.

Conventional audio devices are classified into stereo players and a multichannel players. The stereo player is developed to also provide a mono playback function. The multichannel player is developed to also provide a stereo playback function. A bitstream extension method for the application of a data structure for generating bitstreams of mono/stereo audio signals to multichannel audio signals is provided in ISO/IEC 13818-3.

FIG. 2 illustrates a first example of a data structure of an extensible bitstream for a multichannel audio signal used in ISO/IEC 13818-3. As illustrated in FIG. 2, to support compatibility with ISO/IEC 11172-3, multichannel audio data is inserted into ancillary data 1 of an ISO/IEC 11172-3 bitstream. Thus, when a bitstream of a multichannel audio signal is generated using the data structure illustrated in FIG. 2, it is necessary to decompose and analyze mono/stereo data and determine whether multichannel audio data exists based on whether a syncword for multichannel extension is included in an ancillary data portion.

FIG. 3 illustrates a second example of a data structure of an extensible bitstream for a multichannel audio signal used in ISO/IEC 13818-3. The data structure illustrated in FIG. 3 is configured to further include additional multichannel data in addition to a bitstream having a size compatible with MPEG-1. Thus, to check if the frame length of a bitstream is extended, it is determined whether multichannel audio data exists based on whether a syncword is included in an ancillary data portion of an MPEG-1 part and then it is determined whether an additional bitstream exists as an extension part using an ancillary data pointer.

When a multichannel audio signal is encoded/decoded using the conventional bitstream data structure, it is difficult to determine whether an audio signal included in a bitstream is a multichannel signal including other channel signals in addition to stereo/mono channel signals. As a result, the audio signal cannot be efficiently processed according to the user's demand or the performance of an audio player. Moreover, since the maximum frame length is predetermined, the total frame length cannot be efficiently used.

BRIEF SUMMARY

An aspect of the present invention provides a method and apparatus for generating a bitstream, in which channel information of an encoded audio signal can be easily detected from a bitstream, and an audio encoding/decoding method and apparatus using the method and apparatus.

An aspect of the present invention also provides a method and apparatus for generating a bitstream, in which the total frame length of a bitstream can be set variable according to the characteristic of an audio signal, and an audio encoding/decoding method and apparatus using the method and apparatus.

An aspect of the present invention also provides a method and apparatus for generating a bitstream, in which a region where each of encoded audio signals is located is easily detected from a bitstream to simultaneously decode audio signals corresponding to units of encoding, and an audio encoding/decoding method and apparatus using the method and apparatus.

According to an aspect of the present invention, there is provided a method of generating a bitstream of an audio signal using an encoded audio signal and encoding information. The method includes generating a flag indicating whether the encoded audio signal is a multichannel audio signal, generating a bitstream header including the generated flag, and generating the bitstream using the generated bitstream header and the encoded audio signal.

According to another aspect of the present invention, there is provided a method of generating a bitstream using an encoded signal and encoding information. The method includes determining the possible maximum frame length of the bitstream to determine the number of bits assigned to data having frame length information according to the determined maximum frame length, generating a frame length of the bitstream as signal data encoded with the determined number of bits, and generating the bitstream using the generated frame length information data and the encoded signal.

According to still another aspect of the present invention, there is provided an apparatus for generating a bitstream of an audio signal using an encoded audio signal and encoding information. The apparatus includes a flag generating unit, a header generating unit, and a combining unit. The flag generating unit generates a flag indicating whether the encoded audio signal is a multichannel audio signal. The header generating unit generates a bitstream header including the generated flag. The combining unit generates the bitstream using the generated bitstream header and the encoded audio signal.

According to yet another aspect of the present invention, there is provided an apparatus for generating a bitstream using an encoded signal and encoding information. The apparatus includes a number-of-bit determining unit, a frame length data generating unit, and a combining unit. The number-of-bit determining unit determines the possible maximum frame length of the bitstream to determine the number of bits assigned to data having frame length information according to the determined maximum frame length. The frame length data generating unit generates a frame length of the bitstream as signal data encoded with the determined number of bits. The combining unit generates the bitstream using the generated frame length information data and the encoded signal.

According to yet another aspect of the present invention, there is provided a data structure of a bitstream of an encoded audio signal. The data structure includes a bitstream header including information about whether the encoded audio signal is a multichannel audio signal, frame length information data having frame length information of the bitstream, and data of the encoded audio signal.

According to yet another aspect of the present invention, there is provided a method of encoding an audio signal. The method includes encoding channel signals included in the audio signal in units of encoding, generating a bitstream header including a flag indicating whether the encoded audio signal is a multichannel audio signal, and generating a bitstream using the generated bitstream header and the encoded audio signal.

According to yet another aspect of the present invention, there is provided an apparatus for encoding an audio signal. The apparatus includes an encoding unit, a header generating unit, and a bitstream generating unit. The encoding unit encodes channel signals included in the audio signal in units of encoding. The header generating unit generates a bitstream header including a flag indicating whether the encoded audio signal is a multichannel audio signal. The bitstream generating unit generates a bitstream using the generated bitstream header and the encoded audio signal.

According to yet another aspect of the present invention, there is provided a method of decoding an input bitstream of an audio signal. The method includes checking if the audio signal is a multichannel signal using a flag included in a bitstream header of the bitstream and decoding the audio signal according to whether the audio signal is a multichannel signal or not.

According to yet another aspect of the present invention, there is provided an apparatus for decoding an input bitstream of an audio signal. The apparatus includes a multichannel detecting unit and a decoding unit. The multichannel detecting unit checks if the audio signal is a multichannel signal using a flag included in a bitstream header of the bitstream. The decoding unit decodes the audio signal according to whether the audio signal is a multichannel signal or not.

According to yet another aspect of the present invention, there is provided a computer-readable recording medium having recorded thereon a program for implementing the method of generating a bitstream of the audio signal and the audio encoding/decoding method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
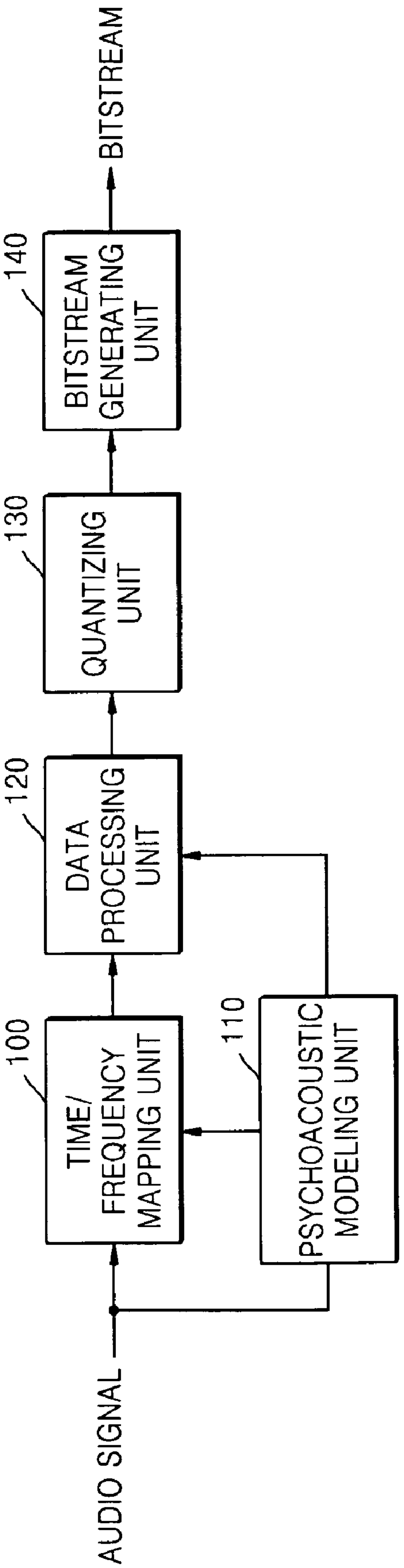
FIG. 1 (PRIOR ART)
FIG. 1 is a block diagram of a conventional audio encoder.
Figure 2:
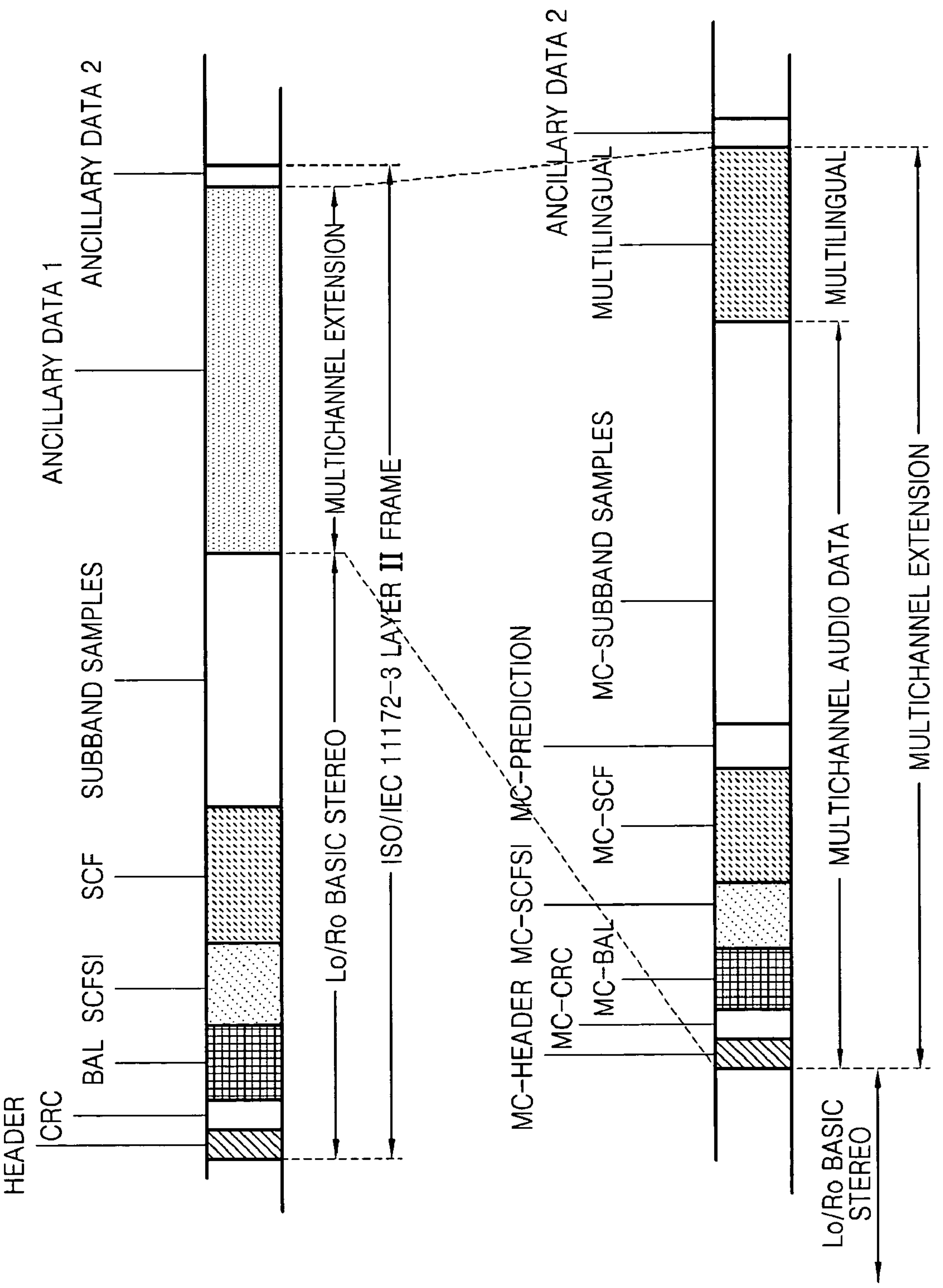
FIG. 2 (PRIOR ART)
FIG. 2 illustrates a first example of a data structure of an extensible bitstream for a multichannel audio signal used in ISO/IEC 13818-3.
Figure 3:
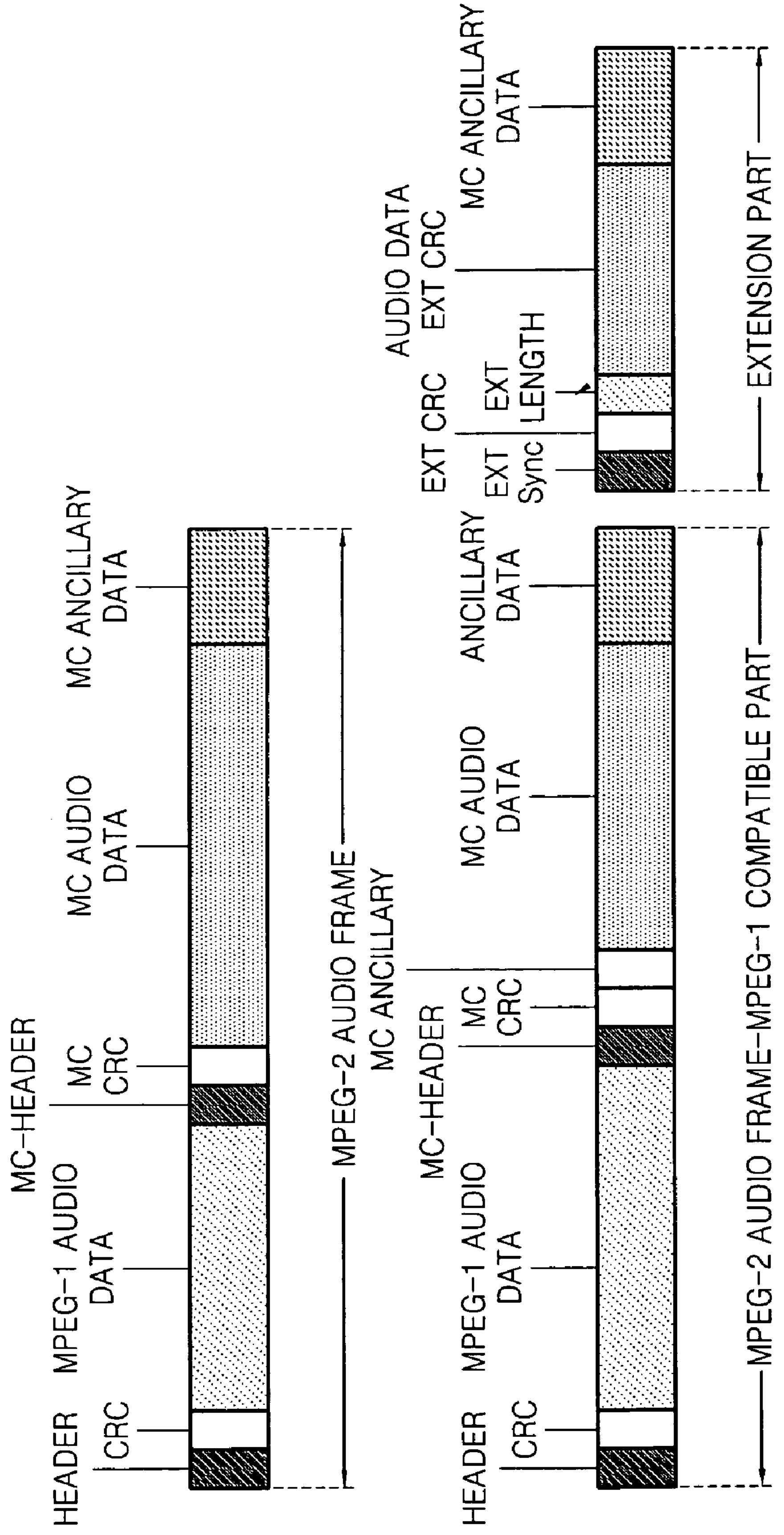
FIG. 3 (PRIOR ART)
FIG. 3 illustrates a second example of a data structure of an extensible bitstream for a multichannel audio signal used in ISO/IEC 13818-3.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
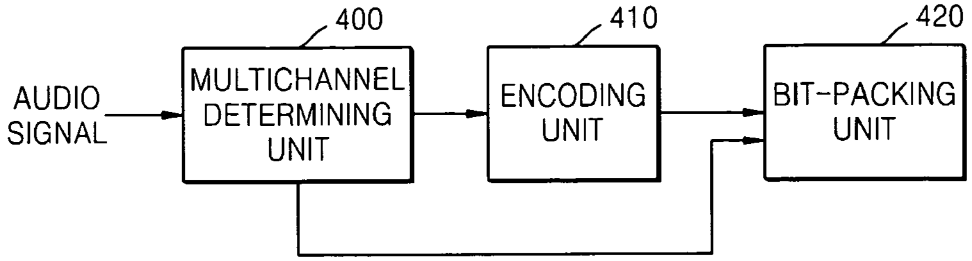
FIG. 4 is a block diagram of an audio encoder according to an embodiment of the present invention.

FIG. 4 is a block diagram of an audio encoder according to an embodiment of the present invention. The audio encoder includes a multichannel determining unit 400, an encoding unit 410, and a bit-packing unit 420.

The multichannel determining unit 400 detects channel information of an input audio signal to determine whether the input audio signal includes only stereo/mono channel signals or is a multichannel signal including other channel signals such as a center channel signal or surround left/right channel signals in addition to the stereo/mono channel signals. It is advantageous that the multichannel determining unit 400 determines whether to encode the audio signal as a multichannel signal using encoding information input by a user through a user input unit (not shown). For example, when the user desires to encode the audio signal as the stereo/mono channel signals, it is advantageous that the multichannel determining unit 400 determines the input audio signal to be the stereo/mono channel signals even when the input audio signal includes the stereo/mono channel signals, the center channel signal, and the surround left/right channel signals.

The encoding unit 410 receives number of channel information and input audio signal from the multichannel determining unit 400 and encodes the input audio signal based on the received channel information. When the input audio signal is a multichannel signal, the encoding unit 410 divides channel signals included in the input audio signal into a predetermined number of units of encoding and performs encoding in units of encoding. When the input audio signal includes 5 channel signals, i.e., a stereo channel signal, a mono channel signal, a center channel signal, a surround left channel signal, and a surround right channel signal, it is advantageous that the units of encoding are the stereo/mono channel signals, the center channel signal, and the surround left/right channel signals.

When the input audio signal is a multichannel signal, the encoding unit 410 encodes the stereo/mono channel signals first and then encodes the other extension channel signals in units of encoding. The extension channel signals include extension channel type information indicating an audio channel configuration. It is advantageous that the extension channel type information is expressed by a channel configuration index. It is advantageous that the channel configuration index has a 3-bit field indicating an audio output channel configuration as follows. The channel configuration index prescribes the number of channels in channel-to-speaker mapping.

TABLE 1

| Index | Channel-to-speaker mapping | Number of Channels (nch) |
|---|---|---|
| 0 | Center front speaker | 1 |
| 1 | Left, right front speakers | 2 |
| 2 | Rear surround speakers | 1 |
| 3 | Left surround, right surround rear speakers | 2 |
| 4 | Front low frequency effects speaker | 1 |
| 5 | Left, right outside front speakers | 2 |
| 6-7 | reserved | — |

A method of encoding an extension channel signal includes encoding the extension channel signal, encoding additional information for the encoding, encoding the extension channel type information indicating the audio channel configuration, and then encoding the length of the extension channel signal.

Figure 5:
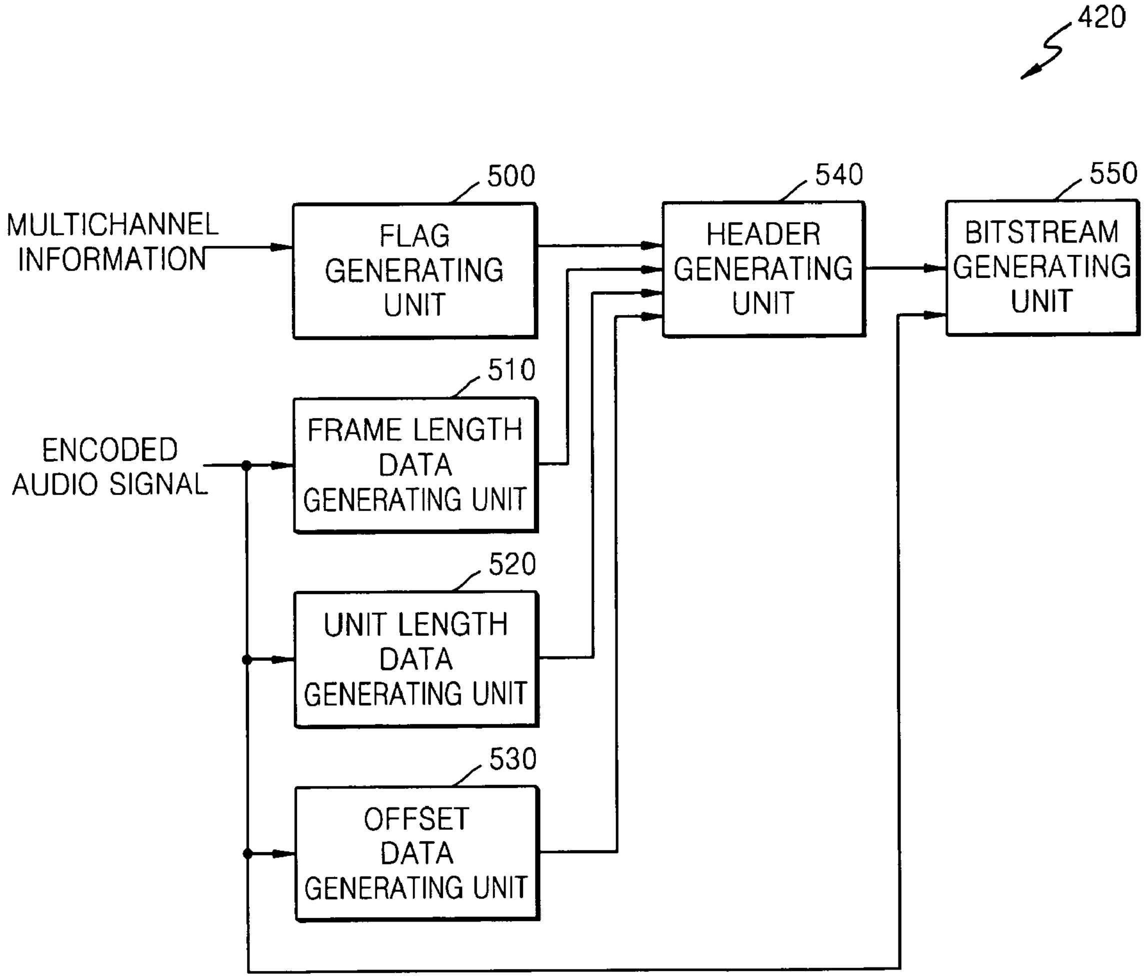
FIG. 5 is a block diagram of the bit-packing unit that generates a bitstream illustrated in FIG. 4.

FIG. 5 is a block diagram of the bit-packing unit 420 of FIG. 4 that generates a bitstream. The bit-packing unit 420 includes a flag generating unit 500, a frame length data generating unit 510, a unit length data generating unit 520, an offset data generating unit 530, a header generating unit 540, and a bitstream generating unit 550. An operation of the audio encoder including the bit-packing unit 420 illustrated in FIG. 5 will be described with reference to a flowchart of FIG. 9 illustrating an audio encoding method according to an embodiment of the present invention.

Figure 9:
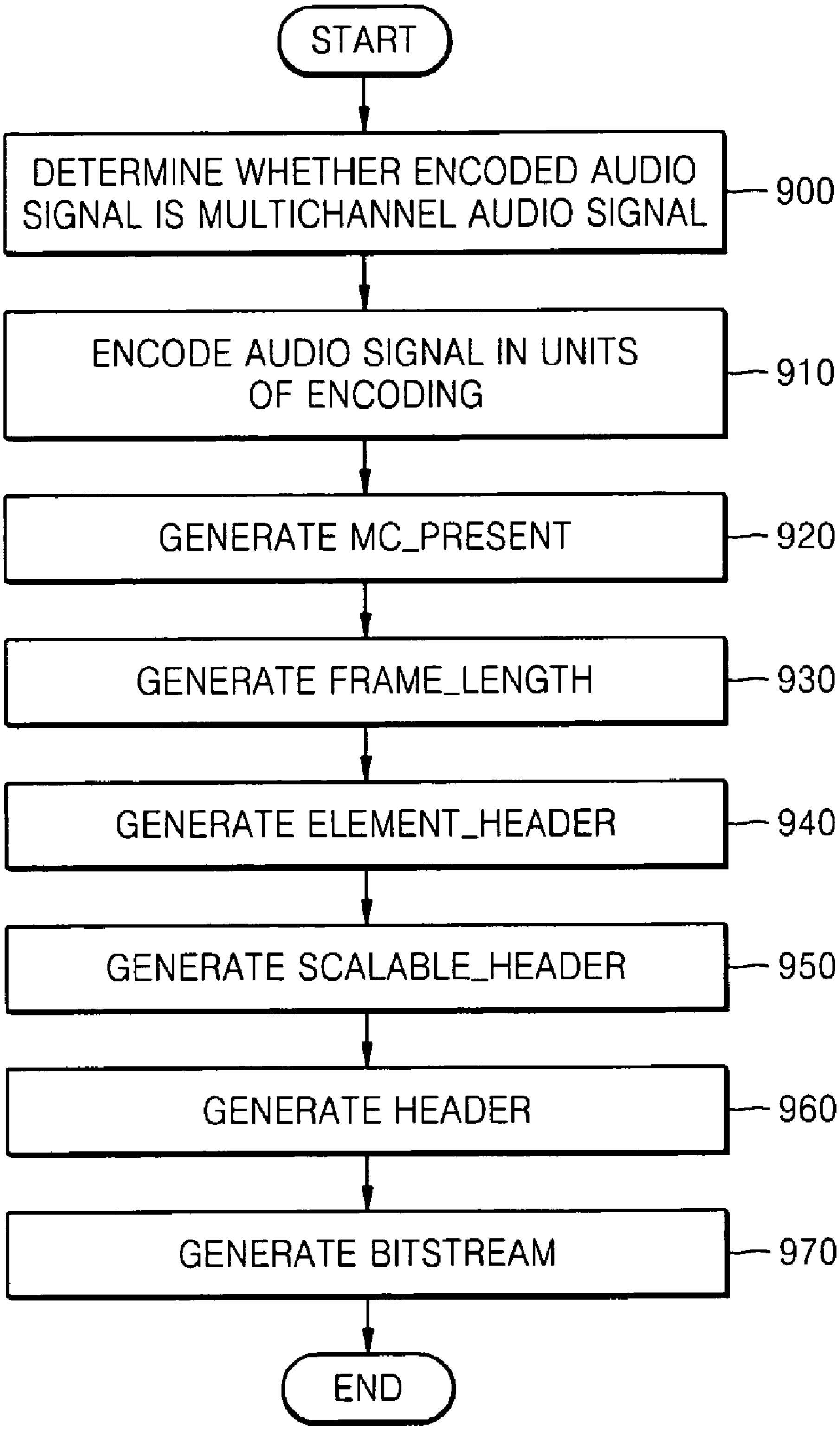
FIG. 9 is a flowchart illustrating an audio encoding method according to an embodiment of the present invention.

Referring to FIGS. 4, 5, and 9, the multichannel determining unit 400 determines whether an input audio signal is a multichannel signal in operation 900. The encoding unit 410 encodes the input audio signal in units of encoding based on channel information received from the multichannel determining unit 400 in operation 910. The units of encoding may be each channel signal, but it is advantageous that channel signals having redundancy are encoded together as a single unit of encoding to improve encoding efficiency.

The flag generating unit 500 receives the number of channel information about whether the input audio signal is a multichannel signal from the multichannel determining unit 400 and generates a flag MC_PRESENT having the number of channel information in operation 920. It is advantageous that the flag generating unit 500 generates the flag MC_PRESENT as 0 when the audio signal includes only stereo/mono channel signals and generates the flag MC_PRESENT as 1 when the audio signal includes other channel signals in addition to stereo/mono channel signals.

The frame length data generating unit 510 generates data FRAME_LENGTH having frame length information of a generated bitstream in operation 930. It is advantageous that the data FRAME_LENGTH has a variable number of bits and includes a flag having information about the extension of the number of bits when the number of bits of the data FRAME_LENGTH is extended to a number greater than the basic number of bits.

Figure 7A:
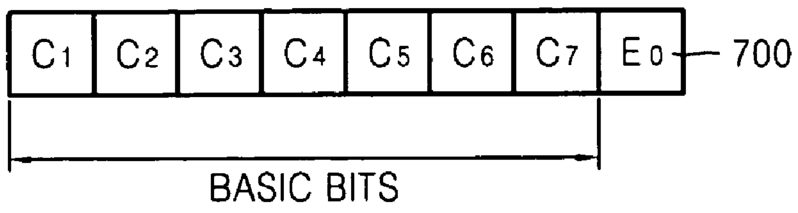
FIGS. 7A, 7B, and 7C are views for explaining a method of variably setting the number of bits of data including frame length information of a bitstream.
Figure 7B:
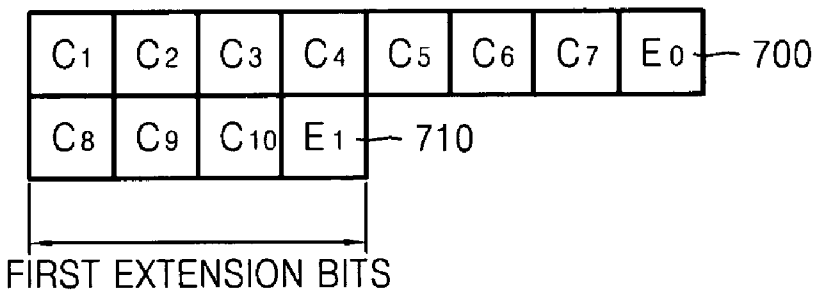
Figure 7C:
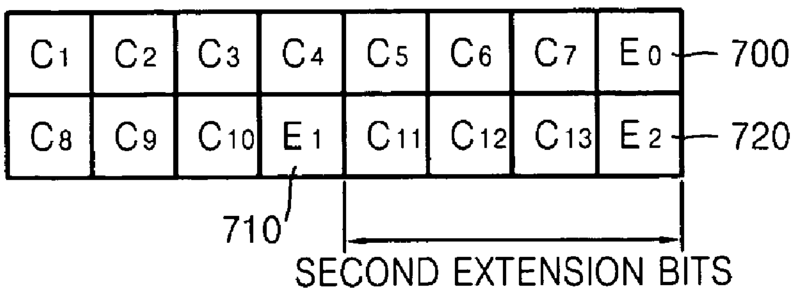

FIGS. 7A, 7B, and 7C are views for explaining a method of variably setting the number of bits of data FRAME_LENGTH. The basic number of bits of the data FRAME_LENGTH is set to 7. As illustrated in FIG. 7A, when the data FRAME_LENGTH is composed of the basic bits of 7 bits, an $E_0$ flag 700 has is 0. As illustrated in FIG. 7B, when the data FRAME_LENGTH has first extension bits of 3 bits in addition to the basic bits of 7 bits, the $E_0$ flag 700 is 1 and an $E_1$ flag 710 is 0.

As illustrated in FIG. 7C, when the data FRAME_LENGTH has the first extension bits of 7 bits and second extension bits of 6 bits in addition to the basic bits of 7 bits and is thus extended by 6 bits, the $E_0$ flag 700 is 1, the $E_1$ flag 710 is 1, and an $E_2$ flag 720 is 0. In this way, the number of bits of the data FRAME_LENGTH can be increased without a limit and the frame length of a bitstream expressed by the data FRAME_LENGTH can be extended without a limit.

Figure 8A:
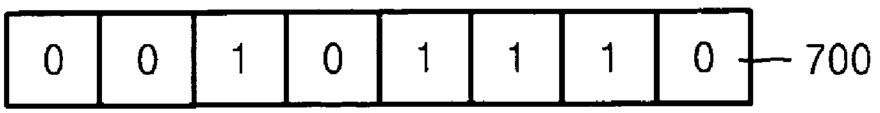
FIGS. 8A, 8B, and 8C illustrate examples generated by a method of variably setting the number of bits of data including frame length information of a bitstream.
Figure 8B:
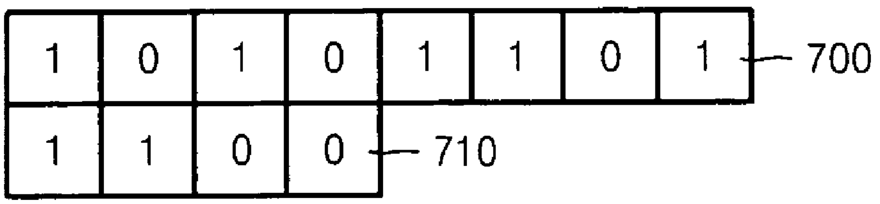
Figure 8C:
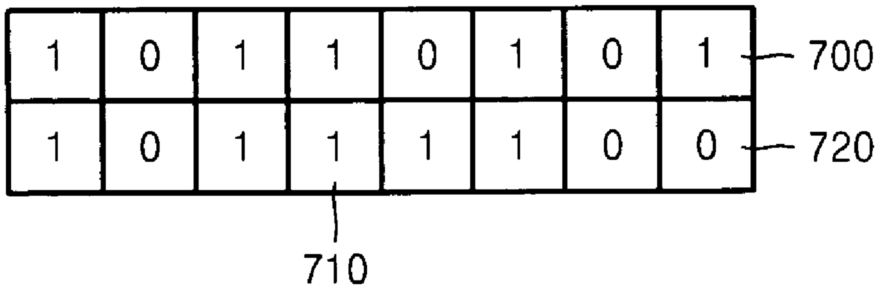

It is advantageous that the frame length data generating unit 510 calculates the maximum frame length using the number of channels of the audio signal and a required compression rate prior to encoding of the audio signal and then determines the number of bits of the data FRAME_LENGTH according to the calculated maximum frame length. FIGS. 8A, 8B, and 8C illustrate embodiments of the data FRAME_LENGTH generated by the method described with reference to FIGS. 7A, 7B, and 7C.

The unit length data generating unit 520 generates data ELEMENT_LENGTH having information about the length of encoded data of each of the encoding units of the audio signal in operation 940. For example, when the encoding units of the audio signal are stereo/mono channel signals, a center channel signal, and surround left/right channel signals, the unit length data generating unit 520 generates data ELEMENT_LENGTH having information about the length of the encoded stereo/mono channel signals, the length of the encoded center channel signal, and the length of the encoded surround left/right channel signals.

The offset data generating unit 530 generates data SCALABLE_HEADER having information about a layer that is the reproduction unit of each of the encoding units of the audio signal to distinguish the layer from a bitstream in operation 950. It is advantageous that the data SCALABLE_HEADER has an offset value for each of layers included in the encoding units. When the audio signal includes only stereo/mono channel signals, offset information of layers included in the encoded stereo/mono channel signals may be calculated as follows.

$$\text{layer\_offset}[n]=\text{layer\_offset}[n-1]+\text{FRAME\_LENGTH}/\text{total\_layer\_num} \quad (1),$$

where layer_offset[n] indicates an offset vale of an $n^{th}$ layer, FRAME_LENGTH indicates a total frame length, and total_layer_num indicates the total number of layers. It is advantageous that an offset value layer_offset[1] of a first layer is set to 0.

When the audio signal includes extension channel signals in addition to the stereo/mono channel signals, offset information of layers included in each of the encoding units may be calculated as follows.

$$\text{layer\_offset}[n]=\text{layer\_offset}[n-1]+\text{ELEMENT\_LENGTH}/\text{total\_layer\_num} \quad (2),$$

where layer_offset[n] indicates an offset value of an $n^{th}$ layer, ELEMENT_LENGTH indicates the length of encoded data of each of the encoding units, and total_layer_num indicates the total number of layers included in the encoding units.

The header generating unit 540 generates a bitstream header using the generated data MC_PRESENT, FRAME_LENGTH, ELEMENT_LENGTH, and SCALABLE_HEADER in operation 960. The bitstream generating unit 550 combines the encoded audio signal and the generated bitstream header, thereby generating a bitstream of the audio signal in operation 970.

Figure 6:
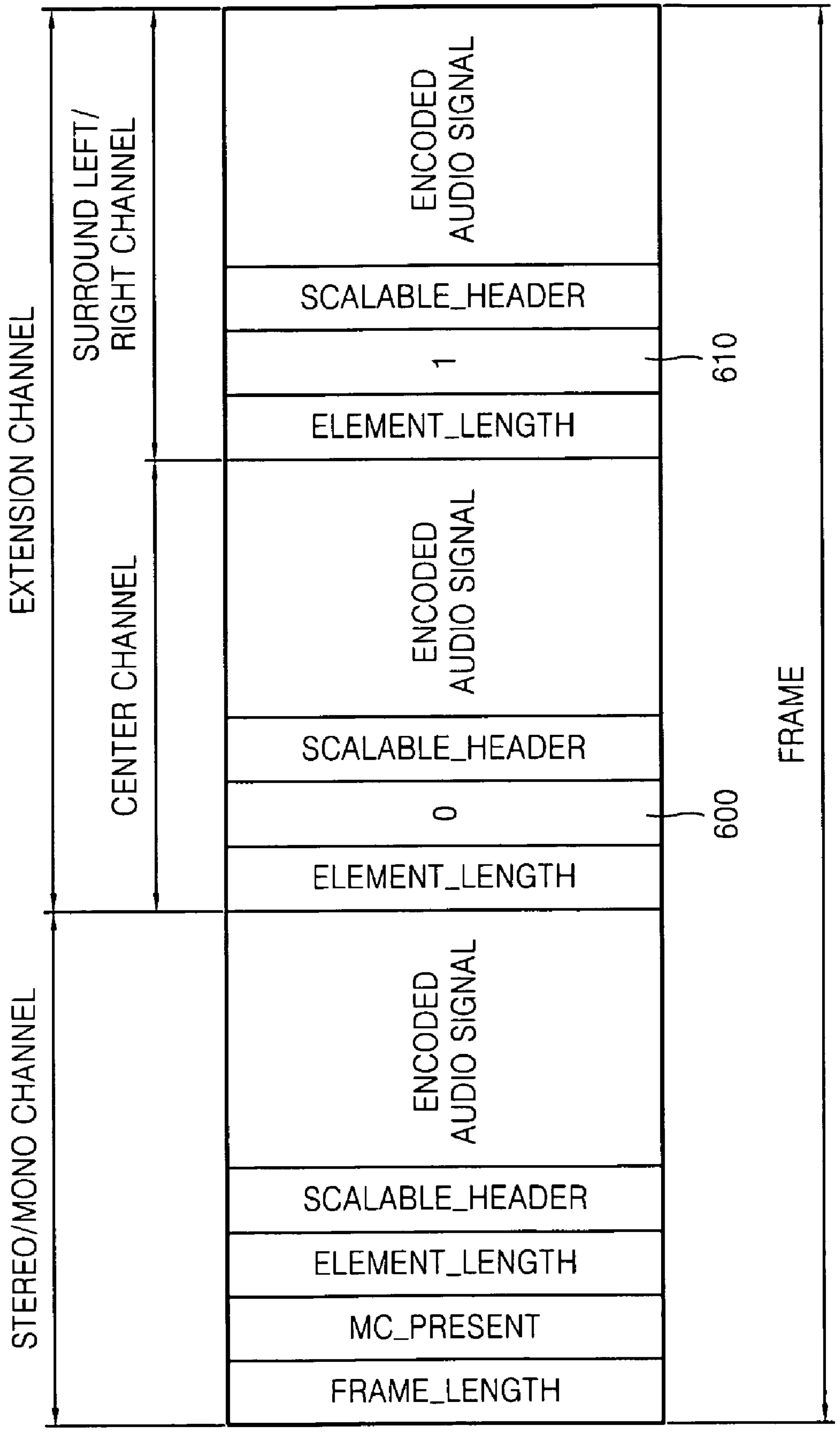
FIG. 6 illustrates a data structure of a bitstream of an audio signal according to an embodiment of the present invention.

FIG. 6 illustrates a data structure of a bitstream of an audio signal according to an embodiment of the present invention, in which the audio signal encoded in units of stereo/mono channel signals, a center channel, and surround left/right channel signals is generated as a bitstream. The bitstream illustrated in FIG. 6 includes audio signals encoded in units of encoding and a bitstream header having information about the bitstream. As illustrated in FIG. 6, the bitstream header includes a stereo/mono channel header in a stereo/mono channel region, a center channel header in a center channel region, and a surround left/right channel header in a surround left/right channel region.

As illustrated in FIG. 6, among data included in the bitstream header, data FRAME_LENGTH indicating a total frame length and a flag MC_PRESENT indicating whether the encoded audio signal is a multichannel signal may be included in the stereo/mono channel header located in front of the bitstream. It is also advantageous that each of the stereo/mono channel header, the center channel header, and the surround left/right channel header includes data ELEMENT_LENGTH having information about the length of encoded data of each of the encoding units and data SCALABLE_HEADER having offset information of layers included in the encoding units. Bits 600 and 610 included in the center channel signal and the surround left/right channel signals that are the extension channel signals indicate indices of the extension channels, respectively.

Examples of a syntax created for the bitstream header are as follows.

```
cbc__base__element( )
{
  Frame__length__data( );
  MC__present
  if(MC__present)
    Element__length__data( );
  cbc__scalable__header( );
  cbc__general__header( );
  byte__alignment( );
  for(slayer = 0; slayer < slayer__size; slayer++)
    cbc__layer__element(slayer);
}
extended__cbc__base__element( )
{
  Element__length__data( );
  channel__configuration__index
  scalable__header( );
  general__header( );
  byte__alignment( );
  for(slayer = 0; slayer < slayer__size; slayer++)
    cbc__layer__element(slayer);
}
```

According to the above syntaxes, data FRAME_LENGTH having information about the total frame length and a flag MC_PRESENT having information about whether an audio signal is a multichannel signal are generated. When the flag MC_PRESENT is 1, i.e., the audio signal is a multichannel signal, data ELEMENT_LENGTH having information about the length of encoded data of each of the encoding units of the audio signal is generated. Then data SCALABLE_HEADER having offset information about a layer that is the reproduction unit of each of the encoding units is generated.

```
Frame__length__data( )/Element__length__data( )
{
Base__Frame__length/Base__Element__length
LengthEnd__flag
if(Frame__length/Element__length > (Pow(2, 7)-1 + 4)
  LengthEnd__flag = 1;
Else
  LengthEnd__flag = 0;
Ehanc__cnt = 0;
while(LengthEnd__flag){
  Enhanc__Frame__length/Ehanc__Element__length
  Ehanc__cnt ++;
  if(Frame__length/Element__length <=
    Pow(2, (7 + Ehanc__cnt*3)) - 1 + 4) {
    LengthEnc__flag = 0;
  }
  LengthEnd__flag
  }
}
```

The above syntax is created for variably setting the number of bits of the data FRAME_LENGTH having frame length information and the number of bits of the data ELEMENT_LENGTH having information about the length of encoded data of each of the encoding units of the audio signal.

As mentioned above, when bits whose number is greater than the basic number of bits is assigned to the data FRAME_LENGTH, LengthEnd_flag of the above syntax is set to 1.

Figure 10:
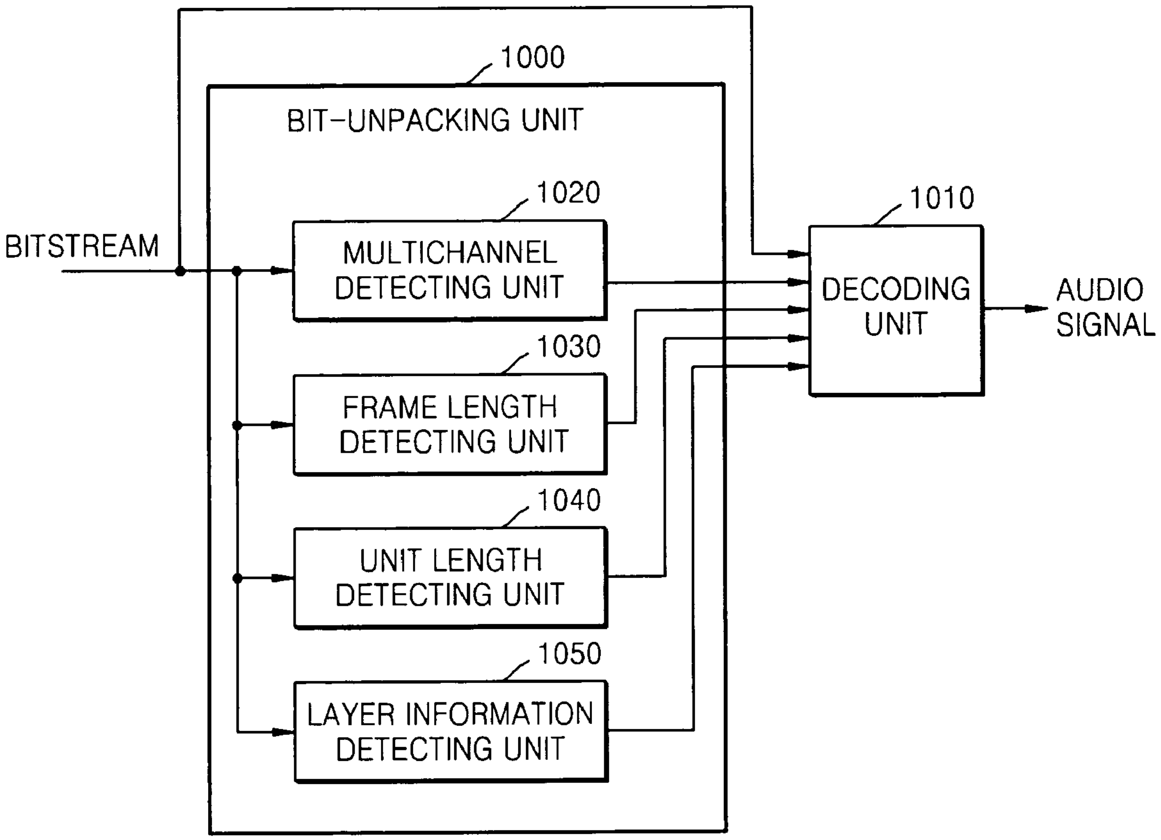
FIG. 10 is a block diagram of an audio decoder according to an embodiment of the present invention.
Figure 11:
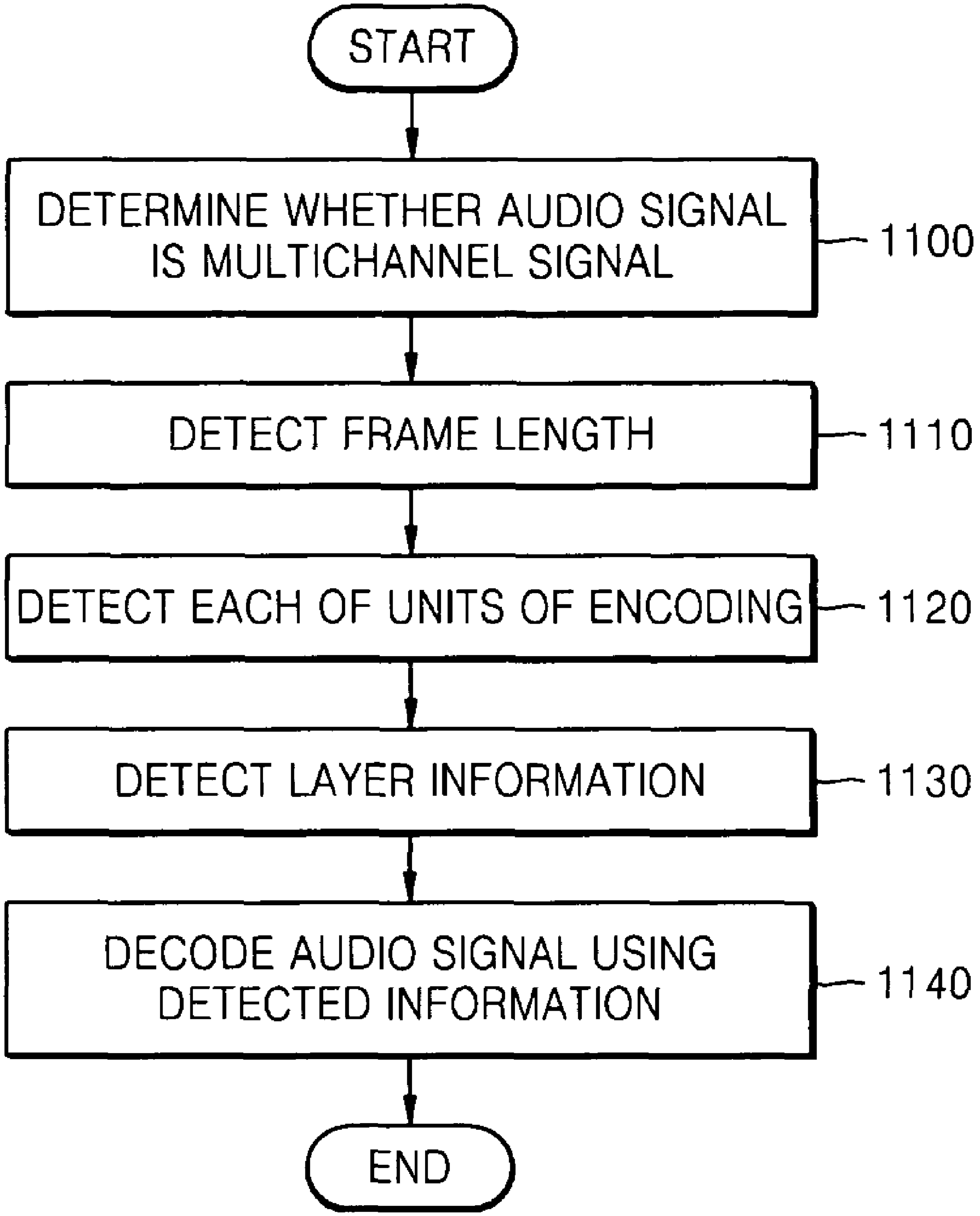
FIG. 11 is a flowchart illustrating an audio decoding method according to an embodiment of the present invention.

FIG. 10 is a block diagram of an audio decoder according to an embodiment of the present invention. The audio decoder includes a bit-unpacking unit 1000 and a decoding unit 1010. The bit-unpacking unit 1000 includes a multichannel detecting unit 1020, a frame length detecting unit 1030, a unit length detecting unit 1040, and a layer information detecting unit 1050. An operation of the audio illustrated in FIG. 10 will be described with reference to a flowchart of FIG. 11 illustrating an audio decoding method according to an embodiment of the present invention.

The multichannel detecting unit 1020 reads a flag MC_PRESENT included in a bitstream header of an input bitstream to check if an audio signal included in the bitstream is a multichannel signal in operation 1100. The multichannel detecting unit 1020 may determine that the audio signal includes only stereo/mono channel signals when the flag MC_PRESENT is 0 and determine that the audio signal includes other channel signals in addition to the stereo/mono channel signals when the flag MC_PRESENT is 1.

The frame length detecting unit 1030 reads data FRAME_LENGTH included in the bitstream header of the bitstream to detect the total frame length of the bitstream in operation 1110. The frame length detecting unit 1030 may read flags having information about whether the number of bits included in the data FRAME_LENGTH is extended to check if the number of bits of the data FRAME_LENGTH is equal to the basic number of bits or is extended and by how many bits the data FRAME_LENGTH is extended and detect the total frame length of the input bitstream from the data FRAME_LENGTH.

If the multichannel detecting unit 1020 determines that the audio signal included in the bitstream is a multichannel signal, the unit length detecting unit 1040 reads data ELEMENT_LENGTH included in the bitstream header of the bitstream and detects the length of encoded data of each of encoding units included in the bitstream in operation 1120. The layer information detecting unit 1050 reads data SCALABLE_HEADER included in the bitstream header of the bitstream and detects offset information about layers included in the bitstream in operation 1130.

The decoding unit 1010 decodes audio data included in the bitstream using information about the unit length data and the bitstream detected by the bit-unpacking unit 1000 in operation 1140.

If the multichannel detecting unit 1020 determines that the audio signal included in the bitstream is a multichannel signal, the decoding unit 1010 may decode only a channel signal desired by a user using information about the length of each of encoding units detected from the data ELEMENT_LENGTH. For example, when the bitstream includes an audio signal encoded in units of stereo/mono channel signals, a center channel, and surround left/right channel signals, only a user-desired signal among three encoded signals may be decoded and reproduced using the detected length of each of the stereo/mono channel signals, the center channel, and the surround left/right channel signals. If an audio player including the audio decoder according to the present invention can play only some of audio channel signals included in the bitstream, e.g., stereo/mono channel signals, the decoding unit 1010 may be controlled to decode only the stereo/mono channel signals that can be played by the audio player using the information about the length of each of the encoding units.

The decoding unit 1010 may simultaneously decode encoded signals included in the bitstream using the information about the length of each of the encoding units detected from the data ELEMENT_LENGTH.

Embodiments of the present invention include computer-readable code on a computer-readable recording medium. A computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves.

According to the above-described embodiments of the present invention, a flag having information about whether an audio signal is a multichannel signal is included in a bitstream header of a bitstream, thereby allowing for efficient and rapid encoding/decoding. Furthermore, by variably setting the number of bits of data having frame length information of a bitstream, it is possible to improve encoding/decoding efficiency and easily increase the number of audio channel signals that can be processed at the same time.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of generating a bitstream of an audio signal using an encoded audio signal and encoding information, the method comprising:

generating a flag indicating whether the encoded audio signal is a multichannel audio signal;

determining a possible maximum frame length of the bitstream to determine a number of bits assigned to data having frame length information according to the determined possible maximum frame length;

generating frame length data of the bitstream as signal data encoded with the determined number of bits;

generating a bitstream header including the generated flag; and generating the bitstream using the generated bitstream header, the generated frame length data, and the encoded audio signal, wherein the number of bits assigned to data having frame length information is variably set based on a number of channel signals included in the encoded audio signal to provide a non-limited frame length for the bitstream for the multichannel audio signal.

2. The method of claim 1, wherein the flag is generated differently when the encoded audio signal has fewer than three channel signals than when the encoded audio signal has three or more channels.

3. The method of claim 1, wherein the bitstream header including the generated flag is a header of stereo/mono channel signals of the bitstream.

4. The method of claim 1, further comprising generating unit length information data having information about a length of the encoded audio signal of each encoding unit of the multichannel audio signal when the encoded audio signal is the multichannel audio signal, wherein the generating a bitstream comprises generating the bitstream using the generated bitstream header, the encoded audio signal, and the generated unit length information data.

5. The method of claim 1, wherein the determining a number of bits comprises determining the number of bits assigned to encoded signal data having the frame length information using a number of channels of the signal and an encoding compression rate.

6. The method of claim 1, wherein the determining a number of bits comprises determining the number of bits assigned to data having the frame length information using the generated frame length of the bitstream.

7. The method of claim 1, wherein the data having the frame length information includes a flag indicating that the frame length information data has bits whose number is greater than a basic number of bits when the determined number of bits is greater than the basic number of bits.

8. The method of claim 1, further comprising generating offset information data for each encoding unit to identify a region of the bitstream occupied by layers included in the encoding units of the signal, wherein the generating a bitstream comprises generating the bitstream using the generated frame length information data, the generated offset information, and the encoded signal.

9. The method of claim 8, wherein the offset information data is generated using a result of dividing the frame length by a number of layers included in the encoding units.

10. The method of claim 8, wherein the offset information data is generated using a result of dividing the length of an encoded signal corresponding to each of the encoding units by a number of layers included in the encoding units.

11. A computer-readable recording medium having recorded thereon a program for implementing the method of claim 1.

12. A method of generating a bitstream using an encoded signal and encoding information, the method comprising;

determining a possible maximum frame length of the bitstream to determine a number of bits assigned to data having frame length information according to the determined possible maximum frame length;

generating a frame length of the bitstream as signal data encoded with the determined number of bits;

generating the bitstream using the generated frame length information data and the encoded signal; and generating offset information data for each encoding unit to identify a region of the bitstream occupied by layers included in the encoding units of the signal, wherein the generating a bitstream comprises generating the bitstream using the generated frame length information data, the generated offset information, and the encoded signal, and wherein the offset information data is generated using a result of dividing the frame length by a number of layers included in the encoding units.

13. A method of generating a bitstream using an encoded signal and encoding information, the method comprising;

determining a possible maximum frame length of the bitstream to determine a number of bits assigned to data having frame length information according to the determined possible maximum frame length;

generating a frame length of the bitstream as signal data encoded with the determined number of bits;

generating the bitstream using the generated frame length information data and the encoded signal; and generating offset information data for each encoding unit to identify a region of the bitstream occupied by layers included in the encoding units of the signal, wherein the generating a bitstream comprises generating the bitstream using the generated frame length information data, the generated offset information, and the encoded signal, and wherein the offset information data is generated using a result of dividing the length of an encoded signal corresponding to each of the encoding units by a number of layers included in the encoding units.

14. An apparatus for generating a bitstream of an audio signal using an encoded audio signal and encoding information, the apparatus comprising:

a flag generating unit generating a flag indicating whether the encoded audio signal is a multichannel audio signal;

a number-of-bit determining unit determining a possible maximum frame length of the bitstream to determine a number of bits assigned to data having frame length information according to the determined possible maximum frame length;

a frame length data generating unit generating frame length data of the bitstream as signal data encoded with the determined number of bits;

a header generating unit generating a bitstream header including the generated flag; and a combining unit generating the bitstream using the generated bitstream header, the generated frame length data, and the encoded audio signal, wherein the number of bits assigned to data having frame length information is variably set based on a number of channel signals included in the encoded audio signal to provide a non-limited frame length for the bitstream for the multichannel audio signal.

15. The apparatus of claim 14, wherein the flag is generated differently when the encoded audio signal has fewer than three channel signals than when the encoded audio signal has three or more channels.

16. The apparatus of claim 15, wherein the bitstream header including the generated flag is a header of stereo/mono channel signals of the bitstream.

17. The apparatus of claim 14, further comprising a unit length data generating unit generating unit length information data having information about a length of the encoded audio signal of each encoding unit of the multichannel audio signal when the encoded audio signal is the multichannel audio signal, wherein the combining unit generates the bitstream using the generated bitstream header, the encoded audio signal, and the generated unit length information data.

18. The apparatus of claim 14, wherein the combining unit determines the number of bits assigned to encoded signal data having the frame length information using a number of channels of the signal and an encoding compression rate.

19. The apparatus of claim 14, wherein the number-of-bit determining unit determines the number of bits assigned to data having the frame length information using the generated frame length of the bitstream.

20. The apparatus of claim 14, wherein the frame length information includes a flag indicating that the frame length information data has bits whose number is greater than a basic number of bits when the determined number of bits is greater than the basic number of bits.

21. The apparatus of claim 14, further comprising an offset data generating unit generating offset information data for each encoding unit of the signal to identify a region of the bitstream occupied by layers included in the encoding units of the signal, wherein the combining unit generates the bitstream using the generated frame length information data, the generated offset information, and the encoded signal.

22. The apparatus of claim 21, wherein the offset information data is generated using a result of dividing the frame length by a number of layers included in the encoding units.

23. The apparatus of claim 21, wherein the offset information data is generated using a result of dividing the length of an encoded signal corresponding to each of the encoding units by a number of layers included in the encoding units.

24. An apparatus for generating a bitstream using an encoded signal and encoding information, the apparatus comprising;

a number-of-bit determining unit determining a possible maximum frame length of the bitstream to determine a number of bits assigned to data having frame length information according to the determined possible maximum frame length;

a frame length data generating unit generating a frame length of the bitstream as signal data encoded with the determined number of bits;

a combining unit generating the bitstream using the generated frame length information data and the encoded signal; and an offset data generating unit generating offset information data for each encoding unit of the signal to identify a region of the bitstream occupied by layers included in the encoding units of the signal, wherein the combining unit generates the bitstream using the generated frame length information data, the generated offset information, and the encoded signal, and wherein the offset information data is generated using a result of dividing the frame length by a number of layers included in the encoding units.

25. An apparatus for generating a bitstream using an encoded signal and encoding information, the apparatus comprising;

a number-of-bit determining unit determining a possible maximum frame length of the bitstream to determine a number of bits assigned to data having frame length information according to the determined possible maximum frame length;

a frame length data generating unit generating a frame length of the bitstream as signal data encoded with the determined number of bits;

a combining unit generating the bitstream using the generated frame length information data and the encoded signal; and an offset data generating unit generating offset information data for each encoding unit of the signal to identify a region of the bitstream occupied by layers included in the encoding units of the signal, wherein the combining unit generates the bitstream using the generated frame length information data, the generated offset information, and the encoded signal, and wherein the offset information data is generated using a result of dividing the length of an encoded signal corresponding to each of the encoding units by a number of layers included in the encoding units.

26. A method of encoding an audio signal, the method comprising:

encoding channel signals included in the audio signal in encoding units;

determining a possible maximum frame length of the bitstream to determine a number of bits assigned to data having frame length information according to the determined possible maximum frame length;

generating frame length data of the bitstream as signal data encoded with the determined number of bits;

generating a bitstream header including a flag indicating whether the encoded audio signal is a multichannel audio signal; and generating a bitstream using the generated bitstream header, the generated frame length data, and the encoded audio signal, wherein the number of bits assigned to data having frame length information is variably set based on a number of channel signals included in the audio signal to provide a non-limited frame length of the bitstream for the multichannel audio signal.

27. The method of claim 26, wherein the flag is generated differently when the encoded audio signal has fewer than three channel signals than when the encoded audio signal has three or more channels.

28. The method of claim 26, further comprising generating unit length information data having information about a length of the encoded audio signal of each encoding unit of the multichannel audio signal when the encoded audio signal is the multichannel audio signal.

29. The method of claim 26, wherein the generating data having the frame length information comprises generating the data having the frame length information to include a flag indicating that the frame length information data has bits whose number is greater than a basic number of bits when the determined number of bits is greater than the basic number of bits.

30. The method of claim 26, further comprising generating offset information data for each encoding unit of the signal to identify a region of the bitstream occupied by layers included in the encoding units of the signal.

31. A computer-readable recording medium having recorded thereon a program for implementing the method of claim 26.

32. An apparatus for encoding an audio signal, the apparatus comprising:

an encoding unit encoding channel signals included in the audio signal in encoding units;

a number-of-bit determining unit determining the possible maximum frame length of the bitstream to determine the number of bits assigned to data having frame length information according to the determined possible maximum frame length;

a frame length data generating unit generating frame length data of the bitstream as signal data encoded with the determined number of bits;

a header generating unit generating a bitstream header including a flag indicating whether the encoded audio signal is a multichannel audio signal; and a bitstream generating unit generating a bitstream using the generated bitstream header, the generated frame length data, and the encoded audio signal, wherein the number of bits assigned to data having frame length information is variably set based on a number of channel signals included in the audio signal to provide a non-limited frame length of the bitstream for the multichannel audio signal.

33. The apparatus of claim 32, wherein the flag the flag is generated differently when the encoded audio signal has fewer than three channel signals than when the encoded audio signal has three or more channels.

34. The apparatus of claim 32, further comprising a unit length data generating unit generating unit length information data having information about a length of the encoded audio signal of each encoding unit of the multichannel audio signal when the encoded audio signal is the multichannel audio signal.

35. The apparatus of claim 32, wherein the data having the frame length information includes a flag indicating that the frame length information data has bits whose number is greater than a basic number of bits when the determined number of bits is greater than the basic number of bits.

36. The apparatus of claim 32, further comprising an offset data generating unit generating offset information data for each encoding units of the signal to identify a region of the bitstream occupied by layers included in the encoding units of the signal.

37. A method of decoding an input bitstream of an audio signal, the method comprising:

checking whether the audio signal is a multichannel signal using a flag included in a bitstream header of the bitstream;

detecting a frame length of the bitstream from frame length information data included in the bitstream, wherein the detecting of the frame length is based a number of bits assigned to data having the frame length information having been variably set based on a number of channel signals included in the audio signal and based on the frame length being configurable to provide a non-limited frame length for the bitstream for a multichannel audio signal; and decoding the audio signal according to whether the audio signal is the multichannel signal, wherein the decoding of the audio signal is performed by referring to the detected frame length and extension channel information included in the bitstream, when the flag indicates that the audio signal is the multichannel signal.

38. The method of claim 37, wherein a frame length of the bitstream is detected using data corresponding to a basic number of bits, included in the frame length information data, a flag indicating whether a number of bits is extended, and data corresponding to the extended number of bits.

39. The method of claim 37, further comprising detecting a length of an encoded audio signal of each encoding unit included in the bitstream using unit length information data included in the bitstream.

40. The method of claim 37, further comprising:

detecting a frame length of the bitstream from frame length information data included in the bitstream;

detecting a length of an encoded audio signal of each encoding unit included in the bitstream using unit length information data included in the bitstream; and identifying a data region corresponding to each of the encoding units included in the bitstream using the detected frame length and an encoding unit length.

41. The method of claim 37, further comprising detecting information about layers included in encoding units using offset information data included in the bitstream.

42. A computer-readable recording medium having recorded thereon a program for implementing the method of claim 37.

43. An apparatus for decoding an input bitstream of an audio signal, the apparatus comprising:

a multichannel detecting unit checking whether the audio signal is a multichannel signal using a flag included in a bitstream header of the bitstream;

a frame length detecting unit detecting a frame length of the bitstream from frame length information data included in the bitstream, wherein the detecting of the frame length is based a number of bits assigned to data having the frame length information having been variably set based on a number of channel signals included in the audio signal and based on the frame length being configurable to provide a non-limited frame length for the bitstream for a multichannel audio signal; and a decoding unit decoding the audio signal according to whether the audio signal is the multichannel signal, wherein the decoding of the audio signal is performed by referring to the detected frame length and extension channel information included in the bitstream, when the flag indicates that the audio signal is the multichannel signal.

44. The apparatus of claim 43, wherein a frame length of the bitstream is detected using data corresponding to a basic number of bits, included in the frame length information data, a flag indicating whether a number of bits is extended, and data corresponding to the extended number of bits.

45. The apparatus of claim 43, further comprising a unit length detecting unit detecting a length of an encoded audio signal of each encoding unit included in the bitstream using unit length information data included in the bitstream.

46. The apparatus of claim 43, further comprising:

a frame length detecting unit detecting a frame length of the bitstream from frame length information data included in the bitstream; and a unit length detecting unit detecting a length of an encoded audio signal of each of encoding units included in the bitstream using unit length information data included in the bitstream;

wherein the decoding unit identifies a data region corresponding to each of the encoding units included in the bitstream using the detected frame length and an encoding unit length and decodes the audio signal.

47. The apparatus of claim 43, further comprising a layer information detecting unit detecting information about layers included in encoding units using offset information data included in the bitstream.

* * * * *

UNITED STATES PATENT AND TRADEMARK OFFICE

CERTIFICATE OF CORRECTION

PATENT NO. : 7,869,891 B2
APPLICATION NO. : 11/445312
DATED : January 11, 2011
INVENTOR(S) : Sanwook Kim et al.

It is certified that error appears in the above-identified patent and that said Letters Patent is hereby corrected as shown below:

Column 14, Line 53, In Claim 33, after "wherein" delete "the flag".

Column 15, Line 13, In Claim 37, after "based" insert --on--.

Column 16, Line 9, In Claim 43, after "based" insert --on--.

Signed and Sealed this
Seventeenth Day of May, 2011

David J. Kappos
*Director of the United States Patent and Trademark Office*